US006144429A

United States Patent [19]

Nakai et al.

[11] Patent Number: 6,144,429

[45] Date of Patent: Nov. 7, 2000

[54] LIQUID-CRYSTAL DISPLAY DEVICE

[75] Inventors: Yutaka Nakai, Yokohama; Masahiko Akiyama, Tokyo, both of Japan

[73] Assignee: Kabushiki Kaisha Toshiba, Kawasaki, Japan

[21] Appl. No.: 08/787,602

[22] Filed: Jan. 23, 1997

[30] Foreign Application Priority Data

Jan. 25, 1996 [JP] Japan .................................... 8-011032

[51] Int. Cl.[7] .................................................. G02F 1/1335

[52] U.S. Cl. ............................................ 349/113; 349/165

[58] Field of Search .............................. 349/113, 64, 112, 349/165, 122, 138

[56] References Cited

U.S. PATENT DOCUMENTS

| | | | |
|---|---|---|---|
| 4,648,691 | 3/1987 | Oguchi et al. | 349/112 |
| 5,548,425 | 8/1996 | Adachi et al. | 349/113 |

OTHER PUBLICATIONS

Japanese Patent Disclosure (Kokai) No. 3–289620Y. Momose; Dec. 19, 1991.

*Primary Examiner*—William L. Sikes
*Assistant Examiner*—Tai V. Duong
*Attorney, Agent, or Firm*—Oblon, Spivak, McClelland, Maier & Neustadt, P.C.

[57] ABSTRACT

A liquid crystal display device comprises a reflector made of a high-reflectance material, a light scattering layer formed on the reflector, the light scattering layer containing light scattering particles introduced into a transparent resin, a first transparent electrode formed on the light scattering layer, a transparent substrate opposed to the light scattering layer with a prescribed gap interposed therebetween, a second transparent electrode formed on the transparent substrate and having a portion that is opposed to the first transparent electrode, and a layer of a guest-host type liquid crystal introduced into the gap between the light scattering layer and the transparent substrate and having a portion that is sandwiched between the first and the second transparent electrode.

16 Claims, 7 Drawing Sheets

LIQUID-CRYSTAL DISPLAY DEVICE

BACKGROUND OF THE INVENTION

The present invention relates to a reflective liquid-crystal display device with a reflecting electrode and more specifically to a liquid-crystal display device which provides improvements in the reflecting structure.

In recent years, the development of new types of display devices that will replace conventional cathode ray tubes has been becoming active. In the market for household electrical appliances and OA equipment, great expectations are held especially for liquid-crystal display devices because of their flatness and low power dissipation.

Heretofore, principal liquid-crystal display devices are of the so-called transmissive types in which a flat type of light called backlight is put on the back of the liquid-crystal panel. However, relatively large power dissipation is produced by the backlight, which constitutes a main cause to prevent the low power operation that should be a merit inherent in liquid-crystal display devices.

Thus, a possible way will be to use a reflective liquid-crystal display device, in which a reflecting plate is placed at the back of the liquid-crystal panel to reflect surrounding light back forward. With this device, there is no need of backlight, ensuring very low power dissipation.

With the reflective liquid-crystal display device, however, the transmittance of the liquid-crystal panel is low, say, a few percent to a few tens of percent. Thus, the reflection of surrounding light alone fails to obtain a satisfactory brightness. For this reason, the reflective liquid-crystal display devices have not been put to practical use except specific applications to wrist watches, hand-held calculators, and the like. However, with the recent development of hand-held equipment, low-power display devices are in increasing demand and hence reflective liquid-crystal display devices are becoming reconsidered.

The point of the reflective liquid-crystal devices is brightness, i.e., reflectance. The reason is that poor transmittance of the liquid crystal must be compensated for by increasing the reflectance to increase visibility. To attain high reflectance, a high-performance reflecting plate is needed.

The reflecting plate should preferably have a property of diffusing light perfectly as shown in FIG. 1. To compensate for poor transmittance of liquid crystal, one possible way will be to use a reflecting surface having a property of reflecting light strongly in specific directions. In this case, although the viewing angle is narrowed down, it is possible to obtain reflection stronger than perfect diffuse reflection with respect to the specific direction.

A method has been proposed which uses a reflecting electrode having a mirror surface as such a reflecting surface. In this case, the reflection in the direction of specular reflection is very strong. However, a problem arises in the use of a mirror surface in a liquid-crystal display device as a reflecting surface in that, when viewed from an angle displaced by a fraction from the direction of specular reflection from the mirror surface, the reflection strength will become virtually zero.

In addition, as shown in FIG. 2, the direction of surface reflection from a front panel 1 of a liquid-crystal display device and the direction of reflection from an reflecting electrode 6 coincide with each other, so that the display screen is viewed shining white, considerably decreasing contrast. In FIG. 2, reference numeral 2 denotes a liquid-crystal layer, 3 an electrode opposed to the reflecting electrode 6, and 7 a substrate.

In a TN (twisted nematic) type of liquid crystal that combines light transmitted through the liquid crystal with polarizers, reflected light from the mirror surface has an effect of increasing image contrast. In a guest-host type of liquid crystal that utilizes light absorption by dye, however, satisfactory coloring cannot be attained and satisfactory contrast cannot be realized.

BRIEF SUMMARY OF THE INVENTION

It is an object of the present invention to provide a scattering reflector which permits its reflecting performance to be controlled easily and stably and permits the display performance of a reflective liquid-crystal display device to be improved without making the manufacturing steps complex and a reflective liquid-crystal display device that uses the scattering reflector. The invention is adapted especially for a reflective liquid crystal display device using a guest-host type of liquid crystal.

According to a first aspect of the invention there is provided a liquid crystal display device comprising: a reflector made of a high-reflectance material; a light scattering layer formed on the reflector, the light scattering layer containing light scattering particles introduced into a transparent resin; a first transparent electrode formed on the light scattering layer; a transparent substrate opposed to the light scattering layer with a prescribed gap interposed therebetween; a second transparent electrode formed on the transparent substrate and having a portion that is opposed to the first transparent electrode; and a layer of a guest-host type liquid crystal introduced into the gap between the light scattering layer and the transparent substrate and having a portion that is sandwiched between the first and the second transparent electrode.

It is preferable that the particles have a property that a ratio of total scattering energy of a single particle of the particles to incident energy per unit cross-sectional area of the single particle is in a range from 0.8 to 3.0, and a volume concentration PVC of the particles in the light scattering layer, an average size D of the particles and an effective thickness d of the light scattering layer be related by $$PVC \geqq D/(3d)$$

The liquid crystal display device of the invention may be arranged to comprise: a reflector made of a high-reflectance material; a light scattering layer formed on the reflector, the light scattering layer containing light scattering particles introduced into a transparent resin; a first transparent electrode formed on the light scattering layer; a transparent substrate opposed to the light scattering layer with a prescribed gap interposed therebetween; a second transparent electrode formed on the transparent substrate and having a portion that is opposed to the first transparent electrode; and a layer of a guest-host type liquid crystal introduced into the gap between the light scattering layer and the transparent substrate and having a portion that is sandwiched between the first and the second transparent electrode, the particles having a property that a ratio of total scattering energy of a single particle of the particles to incident energy per unit cross-sectional area of the single particle is in a range from 0.8 to 3.0.

It is preferable that a volume concentration PVC of the particles in the light scattering layer, an average size D of the particles and an effective thickness d of the light scattering layer be related by $$PVC \geq D/(3d)$$

It is preferable that the effective thickness d of the light scattering layer be 10 micrometers or less.

It is preferable that the reflector be made of an electrically conducting material, the light scattering layer have at least one opening to expose the reflector, and the first transparent electrode be electrically connected to the reflector through the at least one opening.

It is preferable that the transparent resin comprise an acrylic resin.

It is preferable that the particles be made of one selected from a group of titanium oxide, zinc oxide, antimony oxide, zirconium oxide, calcium carbonate, calcium sulfate, barium sulfate and alminum oxide.

According to the invention, the reflector of the liquid crystal display device is made so highly reflective as to obtain strong specular reflection, providing high reflectance and brightness. A reflector that is made of a transparent medium into which light reflecting particles are introduced is formed on the surface of the reflector to provide the light scattering effect. Thus, a wide viewing angle can be obtained by the light scattering effect. The reflecting structure using the light scattering layer as of the invention provides a whiter reflecting surface than the conventional reflecting structure. This will provide an effect of making the white display color of the liquid crystal display device closer to the whiteness of paper (paper whitening effect).

Further, the light scattering layer is made of a transparent medium, such as an acrylic resin, and particles having a light scattering property. By selecting the material and amount of the particles mixed in the transparent medium, the light scattering effect can be controlled. Thus, a diffused reflector can be obtained easily which allows scattering control to be easy and whiteness to be improved.

According to a second aspect of the invention there is provided a liquid crystal display device comprising: a base substrate; a gate line formed on the base substrate; a gate insulating layer formed on the base substrate to cover the gate line; a semiconductor layer formed on the gate insulating layer to be opposed to a portion of the gate line; a source and a drain region formed in the semiconductor layer along both sides of the portion of the gate line, the source and the drain region, the semiconductor layer and the portion of the gate line forming a transistor; a reflector made of a high-reflectance material formed on the gate insulation layer except an area thereof where the transistor is formed; a light scattering layer formed above the gate insulating layer with the transistor and the reflector interposed therebetween and having an opening, the light scattering layer comprising a transparent resin and light scattering particles introduced into the transparent resin; a first transparent electrode formed on the light scattering layer, the first transparent electrode being connected to the source of the transistor through the opening formed in the light scattering layer; a transparent substrate opposed to the light scattering layer with a prescribed gap therebetween; a second transparent electrode formed on the transparent substrate and having a portion that is opposed to the first electrode; and a layer of a guest-host type liquid crystal introduced into the gap between the light scattering layer and the transparent substrate and having a portion sandwiched between the first and second transparent electrodes.

It is preferable that the particles have a property that a ratio of total scattering energy of a single particle of the particles to incident energy per unit cross-sectional area of the single particle is in a range from 0.8 to 3.0, and a volume concentration PVC of the particles in the light scattering layer, an average size D of the particles and an effective thickness d of the light scattering layer be related by $$PVC \geq D/(3d)$$

It is preferable that the effective thickness d of the light scattering layer be 10 micrometers or less.

It preferable that the device further comprises a flattening layer, whose surface is made flat, formed between the gate insulating layer and the light scattering layer to cover the semiconductor layer formed on the gate insulating layer, and the reflector be formed on the flattening layer.

It is preferable that the transparent resin comprises an acrylic resin.

It is preferable that the particles be made of one selected from a group of titanium oxide, zinc oxide, antimony oxide, zirconium oxide, calcium carbonate, calcium sulfate, barium sulfate and aluminum oxide.

According to a third aspect of the invention there is provided a liquid crystal display device comprising: a base substrate; a gate line formed on the base substrate; a gate insulating layer formed on the base substrate to cover the gate line; a semiconductor layer formed on the gate insulating layer to be opposed to a portion of the gate line; a source and a drain region formed in the semiconductor layer along both sides of the portion of the gate line, the source and the drain region, the semiconductor layer and the portion of the gate line forming a transistor; a flattening layer formed on the gate insulating layer to cover the transistor, the flattening layer having an opening; a reflector made of a high-reflectance material formed on the flattening layer, the reflector being connected to the source of the transistor through the opening of the flattening layer; a light scattering layer formed on the reflector, the light scattering layer comprising a transparent resin and electrically conductive and light scattering particles introduced into the transparent resin; a transparent substrate opposed to the light scattering layer with a prescribed gap therebetween; a transparent electrode formed on the transparent substrate and opposed to the light scattering layer; and a layer of a guest-host type liquid crystal introduced into the gap between the light scattering layer and the transparent substrate.

It is preferable that the particles have a property that a ratio of total scattering energy of a single particle of the particles to incident energy per unit cross-sectional area of the single particle is in a range from 0.8 to 3.0, and a volume concentration PVC of the particles in the light scattering layer, an average size D of the particles and an effective thickness d of the light scattering layer be related by $$PVC \geq D/(3d)$$

It is preferable that the effective thickness d of the light scattering layer be 10 micrometers or less.

It is preferable that the particles be made of an alloy of indium tin oxide.

It is preferable that the transparent resin is an acrylic resin.

According to the display device of the third aspect, in addition to the paper whitening effect of the device of the first aspect, power saving owing to electrical resistance being lowered and high-speed operation owing to signal delays being reduced can be attained to improve picture quality. This is because the conductive reflector doubles as the transistor electrode and wiring.

In addition, if the conductive reflector is interposed between the transistor and the transparent conductive layer, the potential of the reflector can be made controllable. Thus, the reflector can be held at an equal potential, permitting the transistor to be shielded from the potential of the transparent electrode serving as a pixel electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Before describing the preferred embodiments of the invention, a scattering reflecting surface will be described.

A possible way to solve the problem with specular reflector described in connection with the related art will be to form microscopic irregularities over the entire surface of a reflector to thereby cause irregular reflection of light. According to this way, since light is reflected irregularly by the irregularities on the surface of the reflector, the above-described problem can be solved.

Methods of forming microscopic irregularities on the reflecting surface are roughly classified into the following two techniques.

The first technique is to make the crystal grains of a metal film by selecting film forming conditions to thereby form a reflector whose surface is coarse. For example, it is known that aluminum becomes cloudy when it is formed into film by heat treatment or when it is introduced with impurities of oxygen, nitrogen, or the like. The cloudy surface thus obtained has some scattering capability. It is known that the crystal grains grow in size by heating aluminum to a temperature of 300° C. or above to form a film or by carrying out heat treatment after film formation. The use of this fact permits a reflecting surface to be obtained which is larger in roughness than the cloudy surface. In addition, chemical etching permits the surface roughness to be increased.

However, since the reflecting surface thus obtained is greatly affected by the film forming temperature and the impurity mixing ratio, etc., a problem will arise when used in liquid-crystal display device in that the device is deficient in in-panel or interpanel stability. It is difficult to control the light scattering capability delicately. Further, when irregularities of the surface are comparable to the wavelengths of visible light, the scattering capability depends on the wavelengths of light, which causes reflected light to look colored.

Figure 1:
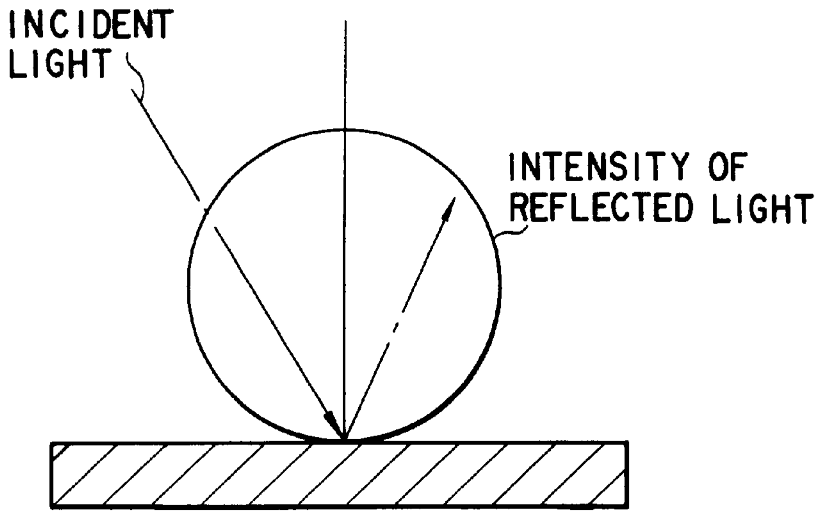
FIG. 1 shows a reflecting characteristic of a perfect diffuse reflecting surface.
Figure 2:
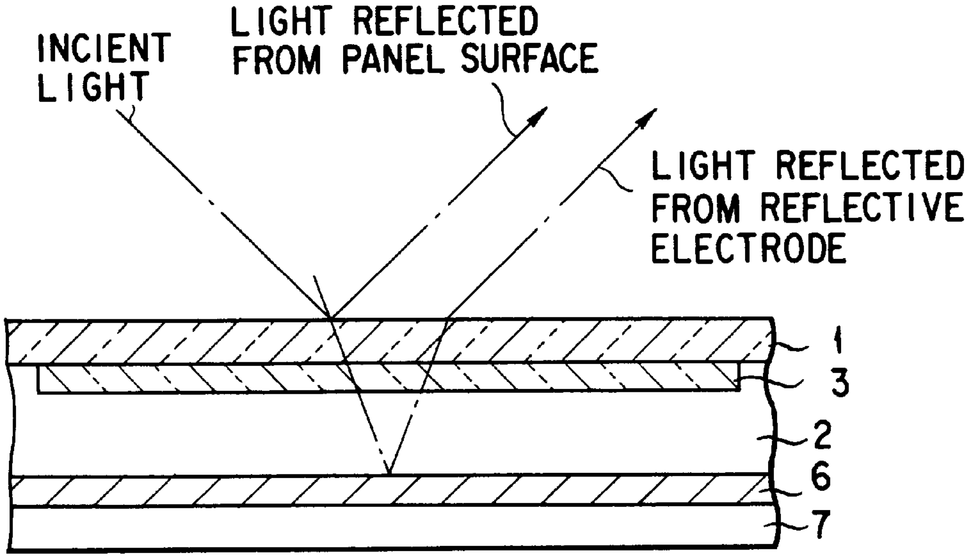
FIG. 2 is a sectional view of a liquid-crystal display device for use in explanation of problems with conventional reflective liquid-crystal display devices.
Figure 3:
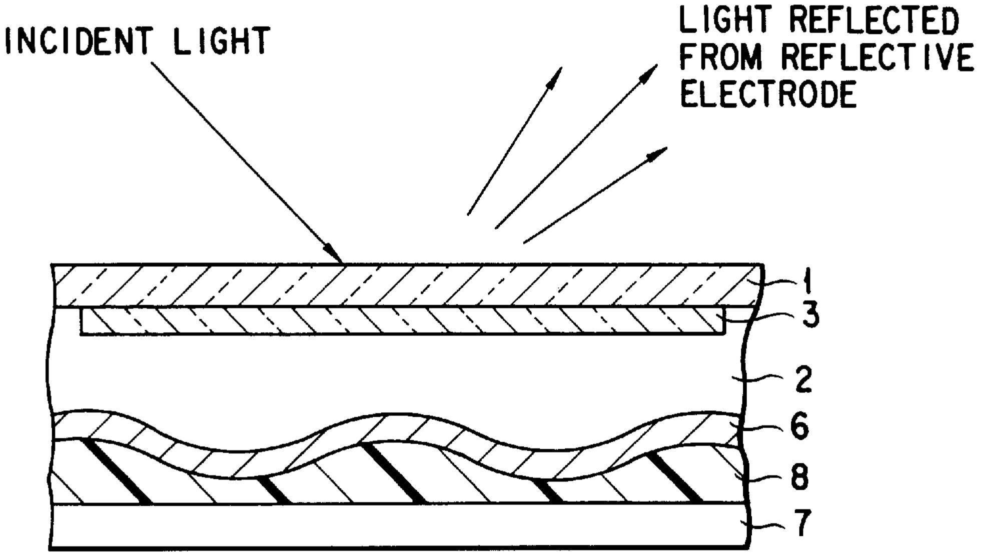
FIG. 3 is a sectional view of an improved reflecting electrode of a reflective liquid-crystal display device.

To solve such problems, one possible way will be to form the irregularities of a reflecting surface by means of photolithographic techniques. This is the second method. According to this method, as shown in FIG. 3, irregularities are first formed on a substrate 8 and then a high-reflectance metal film (reflecting electrode) 6 is formed on the substrate. In FIG. 3, like reference numerals are used to denote corresponding parts to those in FIG. 2. Since the presence of a flat surface contributes to specular reflection, it is preferable that the irregularities be formed of curved surfaces. For this reason, use is made of a resin as the substrate 8 and curved surfaces are formed by heating and deforming the resin.

With this method, however, since irregularities are formed artificially, regularity is liable to occur in the arrangement of the irregularities. If regularity is produced in the arrangement of irregularities, regularity-dependent coherent light is observed, which causes reflected light to be colored. In the direction of the depth of the irregularities as well, similar coherent light will be observed.

To solve these problems, it is required to form irregularities in such a way as to control the regularity to some degree. To this end, several photolithographic steps will be required to be performed. Further, it is very difficult to form microscopic irregularities uniformly over a large surface such as the screen of a liquid-crystal display device. Variations in the shape of irregularities will greatly affect the reflection characteristic.

In the present invention, therefore, a reflecting surface is formed by sputtering a material that allows strong specular reflection, for example, aluminum, and a light scattering layer is then formed by coating the resultant reflecting surface with a mixture of a medium, such as a transparent acrylic resin, and light scattering particles. This light scattering layer provides a moderate light scattering effect and the specular reflection by the reflecting surface. Moreover, the moderate scattering by the light scattering layer provide a wide viewing angle and high contrast. The light scattering layer may be formed by mixing particles of titanium oxide into transparent acrylic resin. The titanium oxide particles are white powder and consequently the screen of the liquid-crystal display device will look as if it were white paper.

At this point, the specifications of the light scattering layer of the invention will be described.

Specifications of Light Scattering Layer

The light scattering characteristic of the light scattering layer depends on the reflectance, size and content of particles contained in a medium and the ratio between the index of refraction of the particles and that of the medium surrounding the particles. It is thus difficult to specify specific values for them. In the present specification, the scattering capability of the light scattering layer is specified in terms of the scattering capability of a single particle and the content of particles.

Scattering Capability of Single Particle

Figure 4:
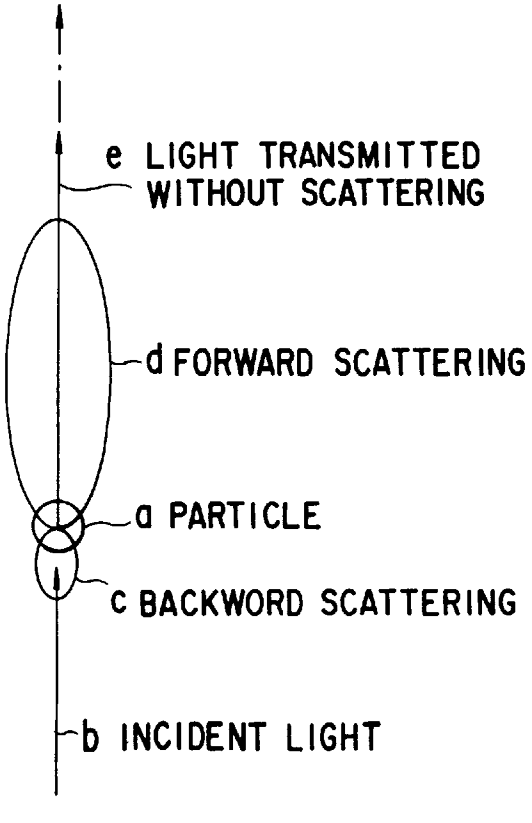
FIG. 4 is a diagram for use in explanation of the scattering of light by a single particle.

As shown in FIG. 4, light b incident on a white particle a is split into scattered light c, d and transmitted light e. When the size of the particle is comparable to the wavelength of visible light, the percentage of the scattered light c and d reduces drastically and the transmitted light e becomes predominant.

Assume that a set of such particles has the same scattering capability as the single particle. Then, a light scattering layer in which the ratio of scattered light to transmitted light is set small will allow strong transmitted light to reach the reflecting surface. If, when the reflecting surface has a great specular reflection factor, transmitted light reaching the reflecting surface becomes strong, then a surrounding image may be reflected in the reflecting surface because specularly reflected components at the reflecting surface are strong. Thus, such a reflecting structure is not suitable for a liquid-crystal display device.

Figure 5:
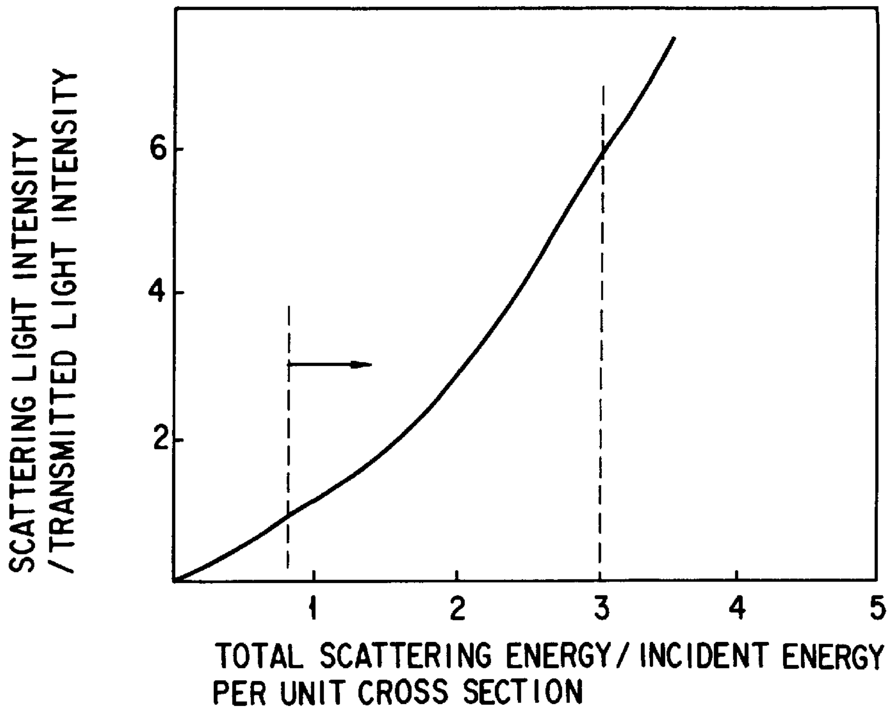
FIG. 5 shows the ratio of scattering light intensity to transmitted light intensity versus the ratio of total scattering energy to incident energy per unit cross-sectional area for a particle.

Considering that a scattering capability in which a scattered light component that travels in the same direction as transmitted light is substantially equal to or more than the transmitted light is most suitable for reflecting structure, a single white particle should have a condition that the ratio ER of the total scattering energy of the particle to the incident energy per unit cross-sectional area of the particle is 0.8 or more (see FIG. 5).

Figure 6:
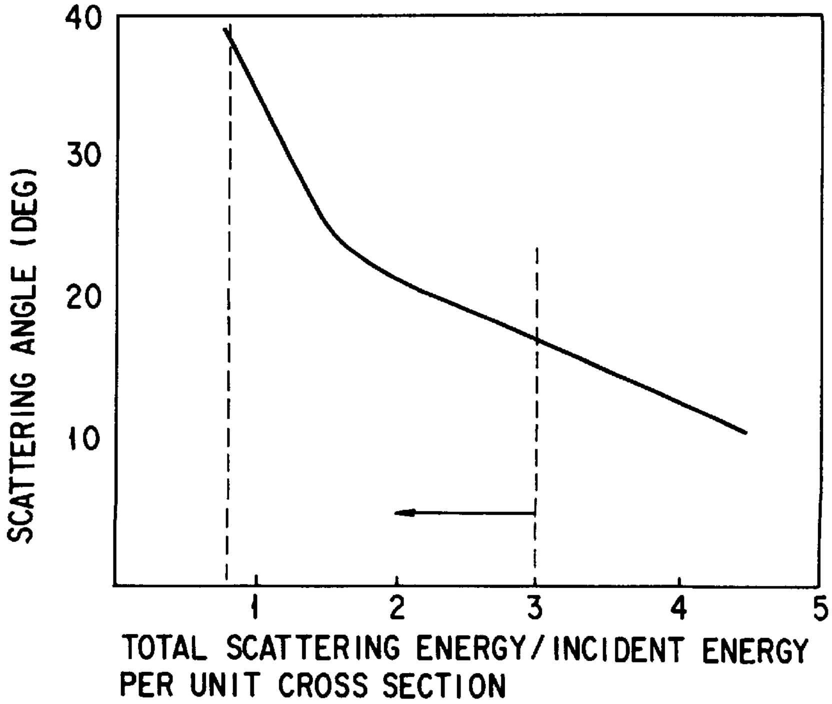
FIG. 6 shows the scattering angle versus the ratio of total scatting energy from the particle to incident energy per unit cross-sectional area for the particle.

When that ratio is too large (i.e., the particle size is large), scattered light components converge in the direction of transmitted light, in other words, the scattering angle becomes small, failing to obtain a satisfactory scattering performance. Thus, as the upper limit, it is preferable that the ratio ER be 3.0 or less (see FIG. 6). For example, when particles of titanium oxide are dispersed in an acrylic resin, the particle size that satisfies the condition will be of the order of 0.3 to 1.5 micrometers.

Content of Particles

The contents of white particles will be described next. The content of white particles is defined by the volume of particles (pigment) contained in unit volume, which is called the pigment volume concentration (PVC). If, when light passes through a scattering layer, the concentration is low, some light components will not pass through particles. These light components become specularly reflected components at the reflecting surface, thus producing such an undesirable situation as described above. Thus, taking into consideration the total sum of cross-sectional areas of particles and a condition that most of light passes through particles, the necessary PVC is defined by $$PVC \geqq D/(3d) \quad (1)$$

where D is the average diameter of the particles and d is the effective thickness of the light scattering layer.

In the presence of a reflecting surface, incident light will pass through the light scattering layer twice. Thus, d is twice the actual thickness of the light scattering layer. Expression (1) is an experimental expression obtained from various experiments made with D and d changed. When PVC becomes smaller than D/(3d), specularly reflected components increase drastically.

Figure 7:
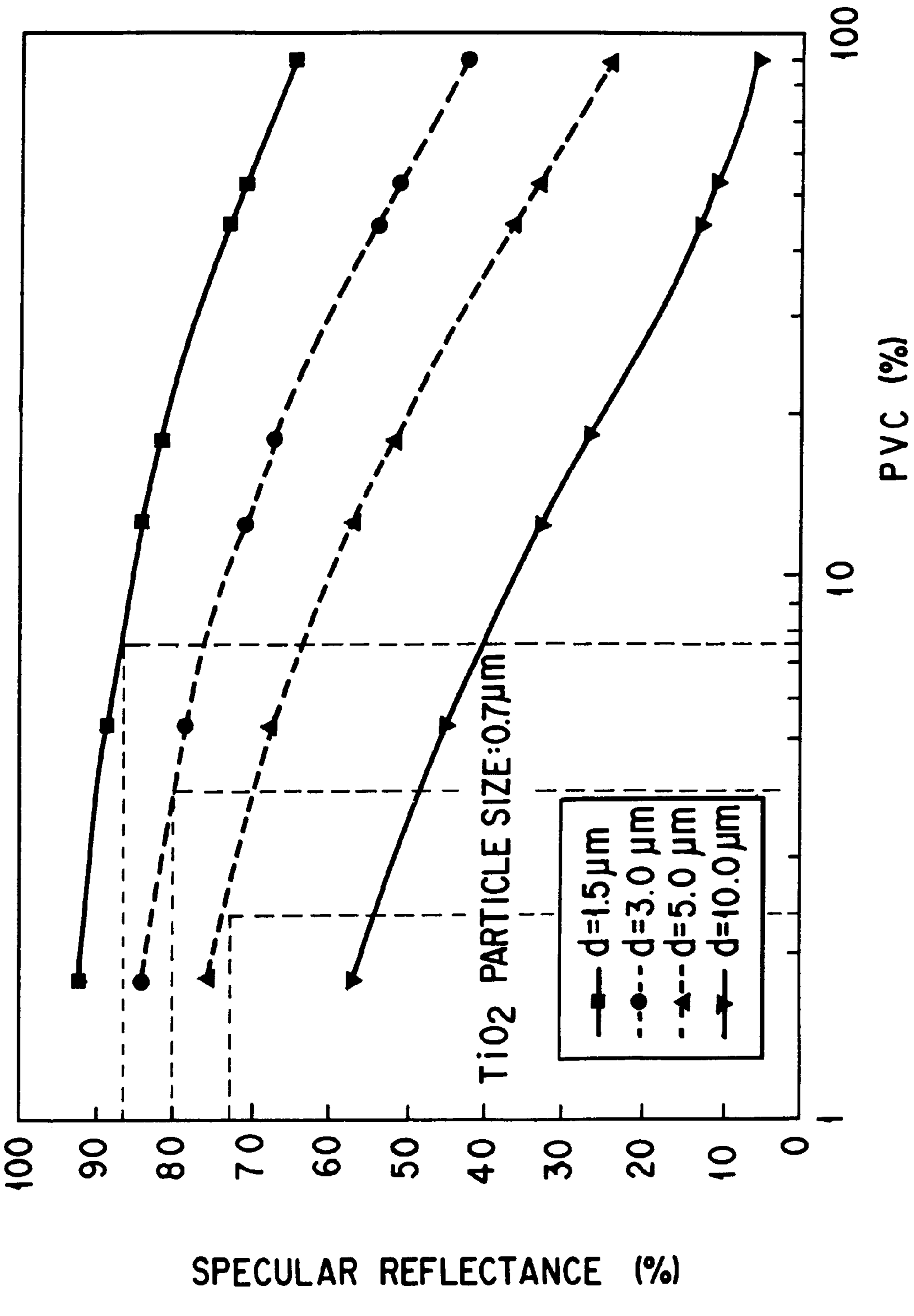
FIG. 7 shows specular reflectance (the ratio of vertically outgoing light to vertically incoming light) versus PVC (pigment volume concentration) when a reflecting electrode of the invention is formed of particles of titanium oxide having an average particle size of 0.7 micrometers.

FIG. 7 shows PVC versus reflectance (the ratio of vertically outgoing light to vertically incident light) when the reflecting electrode of the invention is formed of particles of titanium oxide for which D=0.7 micrometers (the energy ratio corresponds to about 0.96).

When the effective thickness d is changed, the minimum necessary PVC and the corresponding specular reflection factor are listed in Table 1.

TABLE 1

| | | | | |
|---|---|---|---|---|
| d ($\mu$m) | 3.0 | 6.0 | 10.0 | 20.0 |
| PVC (%) | 7.5 | 3.9 | 2.3 | 1.1 |
| specular reflectance (%) | 87 | 80 | 72 | 60 |

In manufacture of a display dot array, as the actual thickness (d/2) of a light scattering layer to be formed, a thickness of several micrometers is appropriate. The specular reflectance is 60% or more for PVCs necessary for d/2=1.5 to 10.0 micrometers. Thus, the effectiveness of the present invention will be understood.

An excess increase in PVC results in a reduction in specular reflectance. Thus, the PVC has an upper limit. That is, an increase in the number of particle components produces irregularities on the surface of the light scattering layer, affecting the operation of liquid crystal. It is desired to determine the PVC so that a specular reflectance of at least 60% can be obtained. To this end, one possible way is to reduce the content of particles and increase the thickness of the light scattering layer correspondingly. However, the light scattering layer is subject to stress and becomes liable to peel off. Otherwise, patterning of the light scattering layer becomes difficult. For this reason, in the present invention, the effective thickness d of the scattering layer is set to 10 micrometers or less.

Conclusion

In summary, the light scattering layer used in the invention has the following conditions:

(1) The ratio ER of total scattering energy of a single particle to incident energy per unit cross-sectional area of the particle is in the range from 0.8 to 3.0.

(2) The volume concentration PVC of particles in the light scattering layer satisfies expression (1).

(3) The effective thickness d of the light scattering layer is 10 micrometers or less.

Hereinafter, descriptions will given of embodiments of a reflective liquid-crystal display device of the present invention equipped with a reflecting section of a dual-reflector structure of a light scattering layer that satisfies the above conditions and a reflecting surface having a large specular reflection factor that underlies a liquid crystal layer.

First Embodiment

Figure 8:
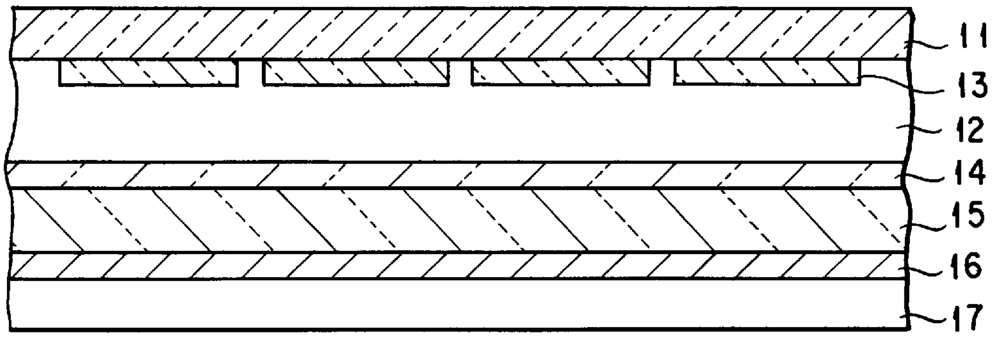
FIG. 8 is a sectional view of a liquid crystal display device according to a first embodiment of the present invention.

FIG. 8 shows a sectional view of a first embodiment of the reflective liquid-crystal display device of the present invention. In this figure, 11 denotes a substrate, 12 a liquid-crystal layer, 13 electrodes, 14 electrodes, 15 a light scattering layer, 16 a reflector (reflecting surface), and 17 a substrate. The liquid crystal display device of this embodiment is formed in such a way that the substrate 11 of a transparent material is placed opposite to the substrate 17 and a guest-host type of liquid crystal material serving as the liquid crystal layer is interposed between the opposite substrates 17 and 11. Although, in the present invention, a guest-host type of liquid crystal material is used, this is not restrictive. Other types of liquid crystal materials may be used.

On that surface of the substrate 17 which is opposed to the substrate 11 are formed in sequence the reflecting surface 16 made of a film of metal having a high reflectance, such as aluminum, the light scattering layer 15, and the transparent electrodes 14. On that surface of the substrate 11 which is opposed to the substrate 17 are formed the transparent electrodes 13. By applying a voltage between the opposed electrodes 13 and 14, i.e., across a pixel, the orientation of liquid crystal molecular arrangement is changed to thereby change the quantity of transmitted light. More specifically, the electrodes 13 each extend in the direction perpendicular to the paper surface, while the electrodes 14 are arranged in parallel with each other in the direction perpendicular to the paper surface and each extend in the direction parallel to the paper surface. An intersection of one of the electrodes 13 and one of the electrodes 14 corresponds to a pixel.

External light emerging from the substrate 11 is reflected by the reflecting surface 16 and then irregularly reflected by the light scattering layer 15. Thus, light is allowed to pass through the liquid crystal in any direction with respect to the substrate 11, widening the viewing angle.

The reflective liquid-crystal display device is manufactured in the following way. In the first place, a film of an alloy of indium tin oxide (ITO) is formed on the surface of the substrate 11 which has been subjected to cleaning. After that, the ITO film is patterned to define the stripe electrodes 13.

Next, a film of alminum is formed on the substrate 17 by means of sputtering, whereby the reflecting surface 16 is formed. On the reflecting surface 16 is then formed by means of spin coating a layer of acrylic resin of 2 micrometers in thickness into which particles of titanium oxide with the average particle size of 0.7 micrometers (corresponds to about 0.96 in the energy ratio ER) is dispersed at a pigment volume concentration of 8%. A heat treatment is next carried out at 200° C. to thereby harden the resin, whereby the light scattering layer 15 is formed. In this case, to allow more light to pass through, the number of titanium oxide particles to be introduced into the acrylic resin is selected to be small.

Next, an ITO film is formed on the light scattering layer 15 by means of sputtering and then etched to form the stripe electrodes 14. In this etching process, an etchant is used which does not attack the light scattering layer 15.

The electrodes 13 and 14 of the substrates 11 and 17 thus formed are coated with a resin of polyimide for alignment of liquid crystal molecules. The substrates 11 and 17 are then stuck together with a constant spacing held therebetween so that the stripe electrodes 13 and 14 intersect at right angles. A guest-host type of liquid crystal is introduced into the gap between the substrates, thereby forming the liquid crystal layer 12.

Figure 9A:
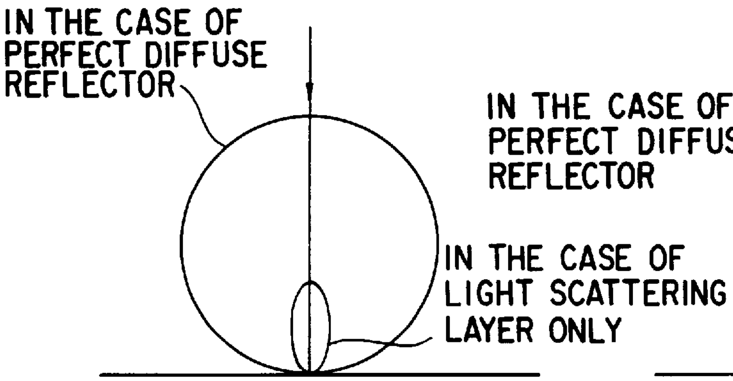
FIGS. 9A and 9B illustrate the effect of the light scattering layer of the invention for the absence and presence of a reflecting surface for vertically incident light.
Figure 9B:
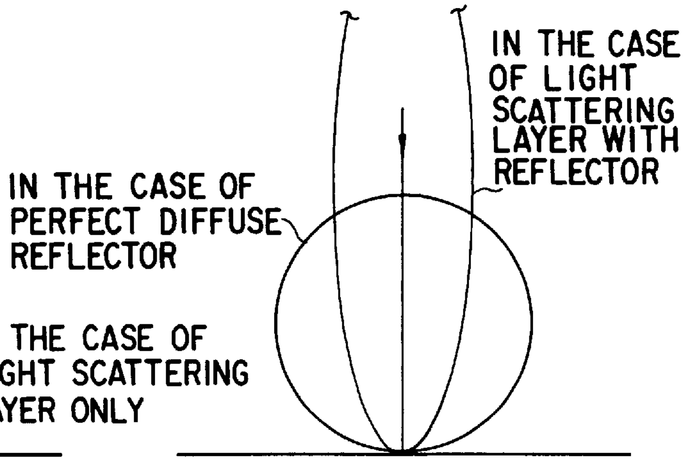

Exemplary reflecting characteristics of the reflective liquid-crystal display device thus fabricated are shown in FIGS. 9A and 9B. FIG. 9A shows a reflecting characteristic of the light scattering layer 15 itself containing the titanium oxide particles for vertical incidence of light. In the present embodiment, since the number of the titanium oxide particles introduced into the acrylic resin is small, only a little reflection or backscattering occurs. That is, most of the incident light passes through the light scattering layer 15.

FIG. 9B shows a reflecting characteristic of the combined structure of the reflecting surface 16 and the light scattering layer 15. In the present embodiment, the light scattering layer 15 is formed on the reflecting surface 16 made of alminum, so that reflection by the reflecting surface 16 and irregular reflection by the light scattering layer 15 are added together.

The reflecting characteristic of the combined structure will be described. The incident light is vertical with respect to the reflecting surface 16. In this case, light transmitted through the light scattering layer 15 is reflected by the reflecting surface 16 back into the scattering layer and then passes through it again while undergoing scattering. For this reason, the incident light is reflected as scattered light and this reflection is strong within a specific range of angles. As a result, within the specific range of angles reflected light is obtained which is much stronger than uniformly diffuse-reflected light.

Figure 10A:
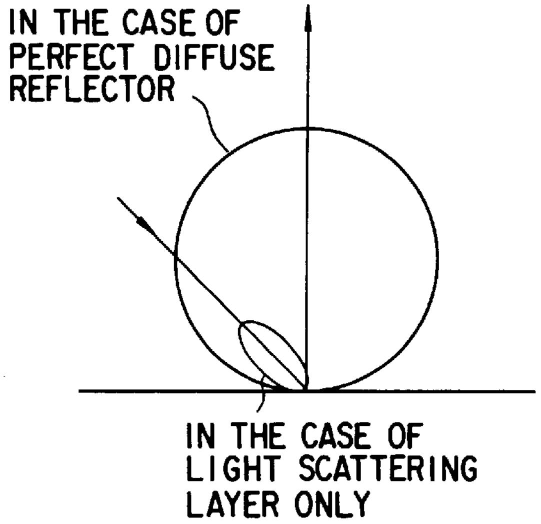
FIGS. 10A and 10B illustrate the effect of the light scattering layer of the invention for the absence and presence of a reflecting surface for incoming light from a 45-degree direction.
Figure 10B:
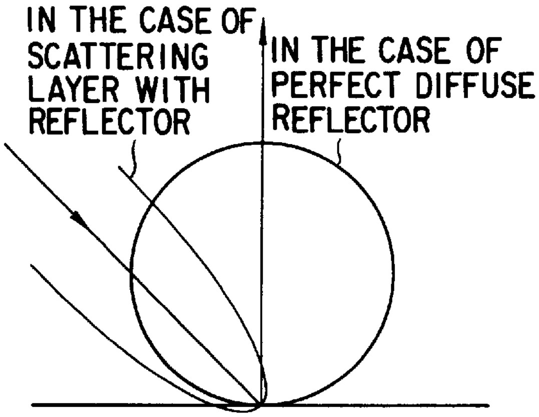

FIGS. 10A and 10B show reflecting characteristics of the reflective liquid-crystal display device of the present embodiment for incident light from the 45-degree direction. More specifically, FIG. 10A shows the reflecting characteristic of the light scattering layer 15 itself and FIG. 10B shows the reflecting characteristic of the combined structure of the light scattering layer 15 and the reflecting surface 16 underlying that layer. Compared with the reflecting characteristic of the light scattering layer 15 itself, the combined structure allows more reflection than perfect diffuse reflection to be obtained in a specific range centered at the direction of specular reflection. It will thus be understood that the combined structure has a satisfactory performance for reflective liquid crystal display devices.

The reflecting surface 16 need not be flat. The reflecting surface itself may be provided with a scattering property. This is accomplished by forming irregularities on the substrate 17 or making the reflecting surface itself rough.

The characteristics of the light scattering layer 15 vary with its thickness, the size and amount of the titanium oxide particle, the optical characteristics of the acrylic resin, etc. The desirable reflectance, i.e., the backscattering factor, of the light reflecting layer varies with structures and applications of reflective liquid crystal display devices. In the present embodiment, it was turned out that a reflectance of 5% or less provides a good reflecting property.

Taking into consideration thickness and flatness control of the light scattering layer 15, it is preferable that the amount of titanium oxide particle to be mixed into the light scattering layer be small. When the size of the titanium oxide particles is in the range of 0.3 to 0.7 micrometers, the tinting ability of titanium oxide becomes best. With a small amount of titanium oxide particle introduced, great scattering can be obtained. As a result of preparation of the light scattering layer 15 under the optimum conditions that were found by changing the amount of titanium oxide particle, a desired characteristic came to be obtained.

Several percent of light incident on the titanium oxide particles in the light scattering layer 15 is scattered backward. The scattered light becomes complicatedly polarized. For this reason, it was turned out that the whiteness of reflected light is improved over the afore-described method of producing scattered light with irregularities on the reflecting surface.

The improvement in whiteness provides the effect of making the display contrast of the liquid crystal display device comparable to contrast between white and black on a printed matter using white paper, the so-called paper whitening effect. Further, the improvement in whiteness will provide users with a psychological effect as if they were working on paper although they are working on OA equipment, i.e., a working environment with an impression of being natural.

Further, when the reflecting structure of the present embodiment consisting of the light scattering layer 15 and the reflecting surface 16 is applied to a reflective liquid crystal display device using a guest-host type of liquid crystal containing dichromatic dye, it was turned out that light scattered by the scattering layer 15 is effectively absorbed by the dichromatic dye to thereby make colors more vivid and improve contrast.

The light scattering layer 15 was described by comprising an acrylic resin as a medium. This is not restrictive. Any other medium, e.g. a polymide resin, allylic resin and the like, can be used as long as it has adhesion to the ITO film and acid resistance. The particles introduced in the medium need not necessarily be made of titanium oxide; it may be of zinc oxide, zinc sulfate, antimony oxide, zirconium oxide, calcium carbonate, calcium sulfate, barium sulfate, alminium oxide or the like.

In an example of a reflective liquid crystal display device described so far, a film of metal having a high light reflectance is deposited over the surface of a substrate to form a reflector (reflecting surface) and a light scattering layer containing particles that allow light to be irregularly reflected is formed on the reflector, and the combined use of the light scattering layer and the reflector provides a strong scattering effect. In this way, high contrast and good visibility can be obtained within a specific range of viewing angles.

In the liquid crystal display device, the electrical resistance of electrodes formed of the ITO film can become a problem. A second embodiment of the liquid crystal display device that solves this problem will be described next.

Second Embodiment

Figure 11:
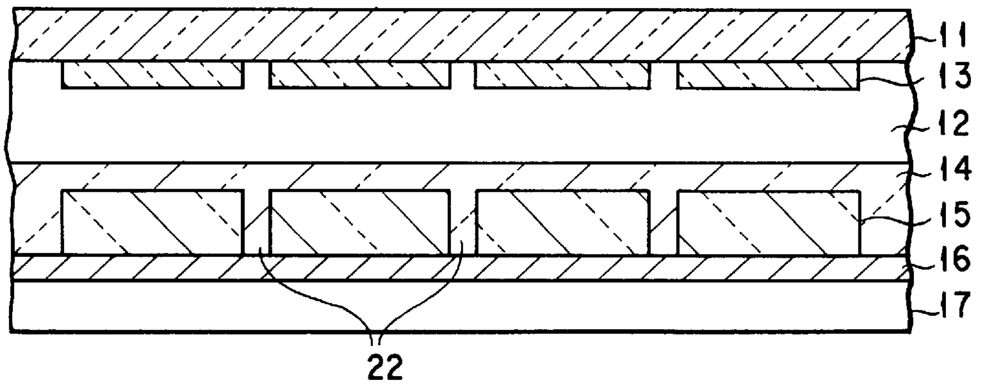
FIG. 11 is a sectional view of a liquid crystal display device according to a second embodiment of the present invention.

FIG. 11 is a sectional view of the second embodiment of the reflective liquid crystal display device of the present invention. In this figure, like reference numerals are used to denote corresponding parts to those in FIG. 8 and description thereof is omitted. Reference numeral 22 denotes contact holes.

On that surface of a substrate 17 which is opposed to a substrate 11 is formed a reflector 16 made of a film of metal having a high light reflectance. On the reflector 16 is formed a light scattering layer 15 formed by mixing light reflecting particles into a transparent resin. In the light reflecting layer 15 are formed small contact holes (slots) 22 that reach the reflector 16. On the light scattering layer 15 is formed ITO transparent electrodes 14. The contact holes are filled with the material of the electrodes 14, with the result that the electrodes 14 contact the metal reflecting surface 16 through the contact holes 22.

On that surface of a substrate 11 which is opposed to the substrate 17 are formed transparent electrodes 13. By applying a voltage between the opposed electrodes 13 and 14, the orientation of liquid crystal molecules sandwiched between the electrodes 13 and 14 is changed.

This reflective liquid crystal display device is fabricated in the following way. First, an ITO film is formed on the surface of the substrate 11 subjected to cleaning and then patterned to define the stripe electrodes 13. Next, a film made of alminum is formed on the substrate 17 by means of sputtering and the film is then patterned to define the stripe reflectors 16.

An acrylic resin which contains particles of titanium oxide whose average size is 0.7 micrometers (corresponds to about 0.96 in the energy ratio ER) at a pigment volume concentration of 7% is coated at a thickness of 2 micrometers. At this point, the contact holes 22 are formed at the same time by means of offset printing. That is, the acrylic resin mixed with titanium oxide particles is offset printed within the display area of the liquid crystal panel in a printing pattern such that the contact holes 22 are formed on the reflectors 16 at regular intervals. The printed acrylic resin containing titanium oxide particles is heated and hardened at 200° C. to thereby form the light scattering layer 15.

Next, the ITO film is formed on the light scattering layer 15 by means of sputtering. At this point, the contact holes are filled with ITO. The ITO film is then patterned in substantially the same pattern as the reflectors 16 to thereby form the stripe electrodes 14.

The electrodes 13 and 14 of the substrates 11 and 17 thus formed are coated with a resin of polyimide for alignment of liquid crystal molecules. The substrates 11 and 17 are then stuck together with a constant spacing held therebetween so that the stripe electrodes 13 and 14 intersect at right angles. A guest-host type of liquid crystal is introduced into the gap between the substrates, thereby forming the liquid crystal layer 12. Note that the liquid crystal need not be of a guest-host type.

The liquid crystal display device thus fabricated exhibits the same reflecting characteristic as described in connection with the first embodiment and is excellent as a reflective liquid crystal display device.

Several percentage of light incident on the titanium oxide particles (of course, other particles may be used as described above) in the light scattering layer 15 is scattered backward. The scattered light becomes complicatedly polarized. For this reason, it was turned out that the whiteness of the reflecting surface is improved over the above-described method of producing scattered light with irregularities on the reflecting surface. The improvement in whiteness provides the effect of making the display screen of the liquid crystal display device comparable to a printed matter using white paper, the so-called paper whitening effect.

Further, when, as in the present embodiment, a guest-host type of liquid crystal containing dichromatic dye is used for the liquid crystal layer 12, light scattered by the scattering layer 15 is effectively absorbed by the dichromatic dye to thereby improve colors and contrast.

In the present embodiment, a large number of contact holes 22 are formed in the light scattering layer 15 and filled with ITO, whereby the transparent electrode 14 and the reflector 16 made of aluminum are electrically connected together. Thus, the reflector 16 serves as an electrode.

It is known that an ITO-based electrode is generally high in resistance and, in high-resolution or large-screen liquid crystal display devices, this high-resistance electrode increases power dissipation or causes signal delays to degrade the display performance. In the present embodiment, however, the reflector 16 acts as an auxiliary electrode for the transparent electrode 14 to thereby lower wiring resistance. This allows for high-speed operation as well as low power dissipation to provide a significant improvement in picture quality.

In the contact holes 22, there is no light scattering layer between the reflector 16 and the transparent electrode 14, so that light undergoes specular reflection. However, since the contact holes are provided only for the purpose of obtaining electrical connection between the light scattering layer and the electrode, their area can be made small enough to have no effect on the display performance.

In the present embodiment, each of the contact holes 22 is aligned with the gap between each electrode 23. Since the liquid crystal above each contact hole is not inherently driven, the influence of the absence of the light scattering layer can be eliminated. The contact holes need not be arranged at intervals of pixel dimension but may be arranged irregularly.

In the present embodiment, the light scattering layer 15 is formed by means of offset printing. This is not restrictive. The lift-off method using a photo resist or any other printing method may be used. The surface of the reflector 16 need not be flat. The reflector itself may be provided with a scattering property. This will be accomplished by forming irregularities on the substrate 17 or by making the the surface of the reflector rough.

The second embodiment described above is characterized in that, in the liquid crystal display device in which a light scattering layer made of a resin in which light reflecting particles are mixed is formed on a reflector formed of a metal film and transparent electrodes are formed on the light scattering layer, contact holes are formed in the light scattering layer to thereby provide electrical connection between the electrodes and the reflector, thereby allowing the reflector to be used as an electrode as well and the resistance of the electrodes to be reduced.

On the other hand, main liquid crystal display devices today use thin film transistors (TFTs) for driving pixels in color display panel. Hereinafter, a third embodiment will be described which is an implementation of a TFT-based liquid crystal display device as a reflective liquid crystal display device that exhibits a good reflecting characteristic.

Third Embodiment

Figure 12:
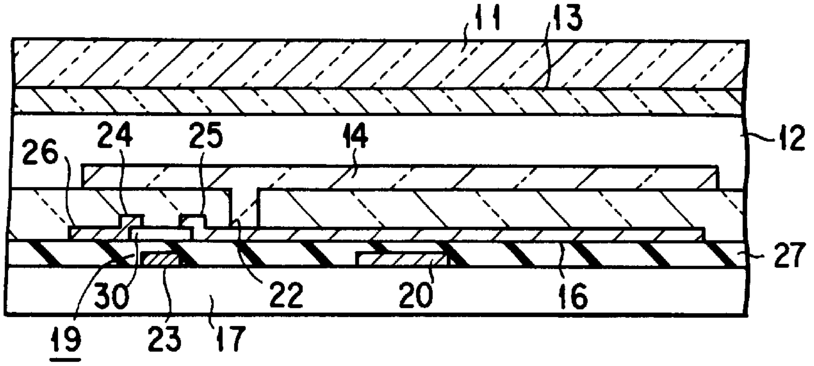
FIG. 12 is a sectional view of a liquid crystal display device according to a third embodiment of the present invention.

Referring to FIG. 12, there is illustrated in section form a TFT-based reflective liquid crystal display device of the third embodiment of the invention for one pixel. Like reference numerals are used to denote corresponding parts to those in the first embodiment. In FIG. 12, reference numeral 23 denotes a gate (line), 24 a drain electrode, and 25 a source electrode, which form a TFT transistor 19. In addition, 36 denotes a signal line, 20 a storage capacitor line, and 27 a gate insulating layer.

The device is fabricated in the following way. First, an ITO film is formed on a surface of a substrate 11 made of a clean, square, transparent plate member and the ITO film is then patterned to form electrodes 13. A layer of molybdenum is formed on a substrate 17 made of a clean, square plate member by means of sputtering and then patterned to form the gate line 23 and the storage capacitor line 20.

Next, a layer of amorphous silicon is formed on the substrate 17 formed with the gate line and the storage capacitor line and then regions (source and drain regions; not shown) in that layer are heavily doped with phosphorus. After that, the layer is patterned to form an amorphous semiconductor region 30. Next, a film of aluminum is formed over the entire surface of the substrate 17 by means of sputtering and then patterned to form a reflector 16, the drain electrode 24, the source electrode 25, and the signal line 26. The TFT 19 is formed of the gate electrode 23, the gate insulating layer 27, the amorphous semiconductor region 30, the drain electrode 24, and the source electrode 25.

Next, over the entire surface of the substrate 17 formed with the gate insulating layer 27, the TFT 19, and the reflector 16, a light scattering layer 15, which has particles of titanium oxide with the average size of 0.7 micrometers (the energy ratio ER corresponds to about 0.96) introduced into a photosensitive acrylic resin at a pigment volume concentration of 8%, is formed at a thickness of 2 micrometers by means of spin coating and then baked at 80° C. Thereby, the light scattering layer with few irregularities is formed.

Next, the light scattering layer 15 is subjected to mask exposure and development to form contact holes 22 and then baked at 200° C. to harden the resin. Thereby, the contact holes reaching the aluminum layer are formed in desired positions in the light scattering layer 15. Since the number of titanium oxide particles introduced into the light scattering layer 15 is small, little scattering of light occurs at the photolithographic exposure time, allowing the contact holes to be formed in good shape. By selecting the baking temperature, it becomes also possible to form tapered contact holes such that the diameter decreases as the depth increases.

Next, an ITO film is formed on the light scattering layer 15 and then patterned to form the transparent electrode 14. The contact hole 22 is filled with the ITO film, so that electrical connection is established between the electrode 14 and the source electrode 25 of the TFT 19.

The electrodes 13 and 14 of the substrates 11 and 17 thus formed are coated with a resin of polyimide for alignment processing of liquid crystal molecules. The substrates 11 and 17 are then stuck together with a constant spacing held therebetween. A guest-host type of liquid crystal is introduced into the gap between the substrates. Note that the liquid crystal is not restricted to a guest-host type.

In the present embodiment, external light coming from the substrate 11 through the electrode 13, the liquid crystal layer 12 and the pixel electrode 14 passes through the light scattering layer 15 and is then reflected by the reflector 16, the drain electrode 24, the source electrode 25, and the signal line 26 back into the light scattering layer. The light then emerges from the scattering layer as weak scattered light.

Consequently, the reflective liquid crystal display device of the present embodiment provides strong reflection in specific directions as with the device of the first embodiment. The reflecting characteristic of the light scattering layer 15 can be changed easily by changing the amount of titanium oxide particle to be introduced into the acrylic resin as a medium. For example, the more the particles, the further the reflecting property is improved and the wider the viewing angle becomes. On the other hand, however, the reflection intensity in specific directions is lowered as the amount of titanium oxide particle increases. Taking into consideration a trade-off between them, the amount of particle is adjusted to a desired property.

The reflector 16 is formed substantially over the pixel area. The area that does not contribute to light reflection is limited to only a very small portion of the reflector that corresponds to the gap between the reflector and the signal line 26, the gap between the TFT 19 and the reflector (both the gaps are planar gaps that cannot be identified in FIG. 10), the contact hole 22, and the TFT 19. Thus, high efficiency of light utilization can be provided.

Several percentage of light incident on the titanium oxide particles in the light scattering layer 15 is scattered backward. The scattered light becomes complicatedly polarized. For this reason, the whiteness of the reflected light is improved over the afore-described method of producing scattered light with artificially formed irregularities on the reflecting surface. The improvement in whiteness provides the effect of making the display screen of the liquid crystal display device comparable to a printed matter using white paper, the so-called paper whitening effect.

Further, when, as in the present embodiment, a guest-host type of liquid crystal containing dichromatic dye is used for the liquid crystal layer 12, light scattered by the scattering layer 15 is effectively absorbed by the dichromatic dye to thereby provide vivid colors and high contrast.

In the present embodiment, a storage capacitor provided for each pixel is defined between the reflector 16 and the storage capacitor line 20. Further, a capacitor formed between the TFT electrode and the capacitor line with the gate insulating layer 27 interposed therebetween can be used as a storage capacitor, providing for ease of design of a desired capacitance value.

In the present embodiment, the steps of forming the light scattering layer 15 and the transparent electrode 14 are added to the TFT and wiring line forming steps of usual liquid crystal display devices. In this case, the light scattering layer is formed by simply coating and patterning an acrylic resin having particles of titanium oxide mixed in and the electrode is formed by simply forming and patterning an ITO film on the light scattering layer. These steps are very simple. According to the present invention, therefore, strong reflection and scattering of light can be obtained without complicating the manufacturing steps, and high contrast and good visibility can be provided within a specific range of viewing angles.

In the present embodiment, the light scattering layer is used as a passivation layer for the TFT 19. After a passivation layer of silicon nitride or the like is formed additionally, the light scattering layer may be formed. In addition, although the light scattering layer 15 was described by comprising an acrylic resin as a medium, this is not restrictive. Moreover, the particles introduced in the medium need not necessarily be made of titanium oxide; it may be of zinc oxide, zinc sulfate, antimony oxide, zirconium oxide, calcium carbonate, calcium sulfate, barium sulfate, aluminum oxide or the like. Furthermore, the surface of the reflector 16 need not be flat. The reflector itself may be provided with a scattering property. This will be accomplished by forming irregularities on the substrate 17 or by making the the surface of the reflector rough. Further, if the gate insulating layer is formed by means of liquid phase deposition, then the reflector 16 will be made flatter, further improving the reflection characteristic.

The second embodiment described above is characterized in that, in the liquid crystal display device which uses TFTs for driving pixels, the combined effect of the light scattering layer and the reflector provides high contrast and good visibility within a specific range of viewing angles and contact holes formed in the light scattering layer provide electrical connection between the electrodes and the reflector, thereby allowing the reflector to be used as an electrode as well and the resistance of the electrodes to be reduced.

In the TFT-based liquid crystal display device, the TFT formed region may protrude so greatly that the surface flatness cannot be maintained without modification. When the flatness cannot be maintained, specularly reflected light reduces, making it impossible to obtain a desired contrast. A technique that permits the flatness to be maintained even with TFTs involved will be described next as a fourth embodiment of the invention.

Fourth Embodiment

Figure 13:
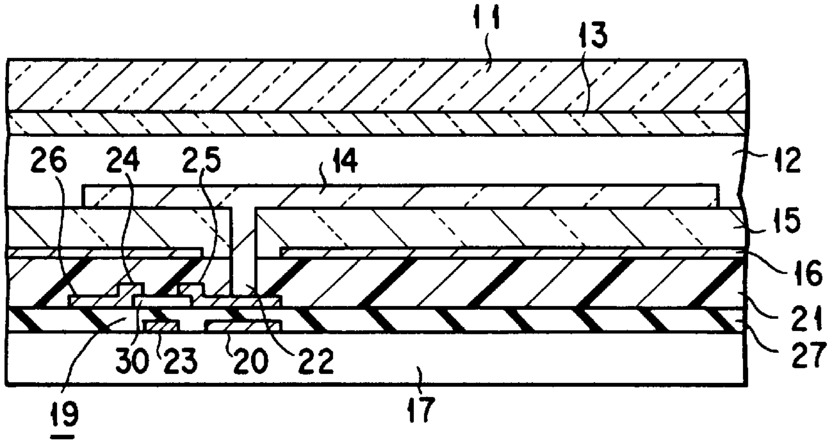
FIG. 13 is a sectional view of a liquid crystal display device according to a fourth embodiment of the present invention.

FIG. 13 illustrates in sectional form a TFT-driven reflective liquid crystal display device of the fourth embodiment for one pixel. Like reference numerals are used to denote corresponding parts to those in the third embodiment. Reference numeral 21 denotes a flattening layer.

The device is fabricated in the following way. First, an ITO film is formed on a surface of a substrate 11 made of a clean, square, transparent plate member and the ITO film is then patterned to form electrodes 13. A layer of molybdenum is formed on a substrate 17 made of a clean, square plate member by means of sputtering and then patterned to form the gate line 23 and the storage capacitor line 20.

Next, a gate insulating layer 27 is deposited over the entire surface of the substrate and a layer of amorphous silicon is then deposited over the gate insulating layer. The amorphous silicon layer is partially and heavily doped with phosphorus to form source and drain regions (not shown) and then patterned to amorphous semiconductor regions 30. After that, a layer of aluminum is formed by means of sputtering and then patterned to thereby form the reflector 16, the drain electrode 24, the source electrode 25, and the signal line 26. The TFT 19 is formed of the gate electrode 23, the gate insulating layer 27, the amorphous semiconductor layer 30, the drain electrode 24, and the source electrode 25.

Next, a layer of photosensitive acrylic resin is formed at a thickness of 1 micrometer by means of spin coating and then baked at 80° C., whereby a flattening layer 21 is formed to overlie the TFT 19. The flattening layer 21 thus formed is subjected to mask exposure and development and then baked at 200° C. so that the resin is hardened. Thus, the flattening layer 21 is formed with the contact hole 22 to reach the source electrode 25 and the top of that layer is kept flat.

Next, a layer of alminum is formed on the flattening layer 21 with the contact holes masked by means of sputtering, so that the reflector 16 of alminum is formed on the layer 21 except portions corresponding to the contact holes.

Next, a layer of photosensitive acrylic resin which has particles of titanium oxide with the average size of 0.7 micrometers (the energy ratio ER corresponds to about 0.96) mixed in at a pigment volume concentration of 12% is formed at a thickness of 1 micrometer by means of spin coating and then baked at 80° C. Next, the layer is subjected to mask exposure and development to form the contact holes 22 and then baked at 200° C. to harden the resin. Thereby, the light scattering layer 15 with few surface irregularities is formed.

Since the number of titanium oxide particles introduced into the light scattering layer 15 is small, little scattering of light occurs at the photolithographic exposure time, allowing the contact holes to be formed in good shape. By selecting the baking temperature, it becomes also possible to form tapered contact holes such that the diameter decreases as the depth increases.

Next, an ITO film is formed on the light scattering layer 15 and then patterned to form the transparent electrode 14. The contact hole 22 is filled with the ITO film, so that electrical connection is established between the electrode 14 and the source electrode 25 of the TFT 19.

The electrodes 13 and 14 of the substrates 11 and 17 thus formed are coated with a resin of polyimide for alignment processing of liquid crystal molecules. The substrates 11 and 17 are then stuck together with a constant spacing held therebetween. A guest-host type of liquid crystal is introduced into the gap between the substrates. Note that the liquid crystal is not restricted to a guest-host type.

In the present embodiment, external light coming from the substrate 11 through the electrode 13, the liquid crystal layer 12, the electrode 14, and the light scattering layer 15 is reflected by the reflector 16 back into the light scattering layer. The light then emerges from the scattering layer as weak scattered light. Consequently, the reflective liquid crystal display device of the present embodiment provides strong reflection in specific directions as with the device of the first embodiment.

Since the bed of the reflector 16 is flattened by the flattening layer 21, the reflector itself is also flat, providing strong specular reflection. Further, the moderate light scattering effect of the light scattering layer 15 provides a very good reflecting characteristic for a desired contrast.

In the present embodiment, the reflector 16 is electrically separated from the TFT 19 by the high-resistivity light scattering layer 15 and the flattening layer 21, so that the potential of the reflector 16 can be controlled independently. Thus, the reflector 16 can be held at an equal potential, shielding the TFT 19 from the potential of the pixel electrode 14.

The pixels are arranged in a matrix form. The influence of capacitive coupling between adjacent pixel electrodes 14 on the display characteristic can also be alleviated by the shielding effect. Further, the photoelectric effect of the TFT can also be suppressed. That is, since the TFT is covered with the reflector 16, the incidence of external light on the TFT is blocked, thus suppressing the adverse influence of the photoelectric effect of the TFT.

The reflector 16 is formed substantially over the pixel area. The area that does not contribute to light reflection is limited to only the contact holes 22. Thus, the light utilization can be made high enough.

In the present embodiment, the storage capacitor is formed between the source electrode 25 and the capacitor line 20. There is therefore no need of special steps for formation of the capacitor, allowing for ease of manufacture. It should be noted, however, that the method of forming the storage capacitor is not limited to that described herein. For example, the capacitor may be formed using the source electrode 25 and the reflector 16.

In the present embodiment, the flattening layer 21 is used as a passivation layer for the TFT 19.

After a passivation layer of silicon nitride or the like is formed additionally, the flattening layer may be formed.

The fourth embodiment is identical in arrangement to the third embodiment except that the flattening layer 21 is interposed between the TFT-formed layer and the light scattering layer 15. It will thus be understood that, in the fourth embodiment as well, the various effects of the light scattering layer in the third embodiment are attained.

The fourth embodiment is directed to a TFT-based liquid crystal display device in which a fattened layer is formed to overlie the TFT, and the reflector and the light scattering layer are formed on the flattening layer, thereby providing a satisfactory contrast and a wide viewing angle.

If particles to be introduced into the light scattering layer is made of a transparent conductive material, then that layer will not only perform a function of scattering light but also serve a function as a transparent electrode. A liquid crystal display device having such a light scattering layer will be described hereinafter as a fifth embodiment of the present invention.

Fifth Embodiment

Figure 14:
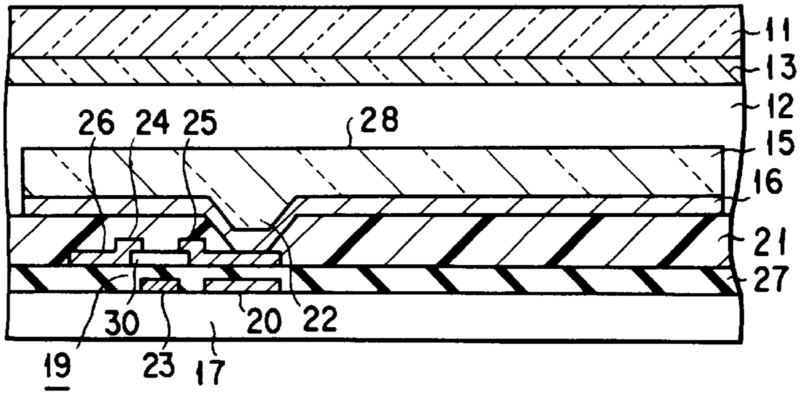
FIG. 14 is a sectional view of a liquid crystal display device according to a fifth embodiment of the present invention.

FIG. 14 illustrates in sectional form a TFT-driven reflective liquid crystal display device of the fifth embodiment for one pixel. Like reference numerals are used to denote corresponding parts to those in the fourth embodiment. Reference numeral 28 denotes an electrically conductive light scattering layer.

The light scattering layer 28 is formed on the flattening layer 21. The layer 28 consists of a photosensitive acrylic resin into which particles of an alloy of indium tin oxide (ITO) with the average particle size of 0.8 micrometers (The energy ratio ER corresponds to about 0.97) are introduced at a pigment volume concentration of 10%.

In this embodiment as well, the formation of the electrodes 13 on the substrate 11 and the formation of the gate insulating layer 27 and the transistor 19 on the substrate 17 are performed in the same manner as the fourth embodiment.

Next, a layer of photosensitive acrylic resin is formed at a thickness of 1 micrometer by means of spin coating and then baked at 80° C., whereby a flattening layer 21 whose surface is made flat is formed. The flattening layer 21 thus formed is subjected to mask exposure and development and then baked at 200° C. so that the resin is hardened. Thus, the flattening layer 21 is formed with the tapered contact hole 22 with its top kept flat.

Next, a layer of alminum is formed on the flattening layer 21 by means of sputtering and then patterned to form the reflector 16 for each pixel, so that the reflector is electrically connected to the source electrode 25 of the corresponding TFT.

Next, a layer of photosensitive acrylic resin which has particles of ITO with the average size of 0.8 micrometers mixed in at a pigment volume concentration of 10% is formed at a thickness of 2 micrometers by means of spin coating and then baked at 80° C., so that the conductive light scattering layer 28 with few irregularities are formed. Next, the layer is patterned for each pixel and then baked at 200° C. to thereby harden the resin. Since the amount of ITO particle introduced into the light scattering layer 15 is so small as 10%, little scattering of light occurs at the photolithographic exposure time, allowing the pattern to be defined precisely.

The electrodes 13 and 14 of the substrates 11 and 17 thus formed are coated with a resin of polyimide for alignment processing of liquid crystal molecules. The substrates 11 and 17 are then stuck together with a constant spacing held therebetween. A guest-host type of liquid crystal is introduced into the gap between the substrates to form the liquid crystal layer 2. Note that the liquid crystal is not restricted to a guest-host type.

In the present embodiment, external light coming from the substrate 11 through the electrode 13, the liquid crystal layer 12, the electrode 14, and the light scattering layer 15 is reflected by the reflector 16 back into the light scattering layer. The light then emerges from the scattering layer as weak scattered light. Consequently, the reflective liquid crystal display device of the present embodiment provides strong reflection in specific directions as with the device of the first embodiment.

Since the bed of the reflector 16 is made flat owing to the flattening layer 21, the reflector itself is also flat, providing a very good reflecting characteristic. A desired reflecting characteristic can be realized easily by changing the amount of ITO particle to be introduced into the acrylic resin as a medium for the conductive light scattering layer 28. For example, the more the particles, the further the light scattering property is improved and the wider the viewing angle becomes. On the other hand, however, the reflection intensity in specific directions reduces as the amount of particle increases. Taking into consideration a trade-off between them, the amount of particle is adjusted to a desired property.

In the embodiment, the transparent electrode 14 used in the fourth embodiment is omitted; instead, the conductive light scattering layer 28 is used as a pixel electrode. Further, since the low-resistivity reflector 16 made of alminum is connected to the source electrode 25 through the contact hole 22, the reflector also acts as a pixel electrode. For this reason, the resistance of the conductive light scattering layer 28 (pixel electrode) is equivalently lowered, providing the same advantage as the fourth embodiment.

The light scattering layer 28 owes its electrical conductivity to ITO particles introduced. In terms of probability, in the layer there appear portions where the density of ITO particles is low. In such portions the resistivity becomes very high. The present embodiment allows the reflector 16 not only to function as the pixel electrode but also to back up the conductive light scattering layer 28 in the electrical characteristic. In case where the pigment volume concentration is low, there may arise the possibility that the conductive light scattering layer 28 is insufficient in conductivity. In this case as well, voltage drop in the light scattering layer is negligibly small because the reflector 16 serves as a pixel electrode and that layer is large in capacitance because of the presence of electrically conductive particles between the reflector 16 and the liquid crystal layer 12.

The present embodiment also provides the paper whitening effect as with the other embodiments described previously, and vivid colors and high contrast when a guest-host type of liquid crystal is used.

In the present embodiment, the reflector 16 is formed substantially over the pixel area. The area that does not contribute to light reflection is limited to only the contact holes 22. Thus, the light utilization can be made high enough. The storage capacitor is formed between the source electrode 25 and the capacitor line 20. The present invention needs no complicated steps for formation of the capacitor. It should be noted, however, that the method of forming the storage capacitor is not limited to that described herein. For example, the capacitor may be formed using the source electrode 25 and the reflector 16.

In the present embodiment, the flattening layer 21 is used as a passivation layer for the TFT 19. After a passivation layer of silicon nitride or the like is formed additionally, the flattening layer may be formed.

Moreover, the medium of the conductive light scattering layer 28 is not limited to a photosensitive acrylic resin. Furthermore, the surface of the reflector 16 need not be flat. The reflector itself may be provided with a scattering property. This will be accomplished by forming irregularities on the bed of the light scattering layer or by making the the surface of the reflector itself rough.

Thus, in the fifth embodiment, by introducing transparent conductive particles into the light scattering layer, wide viewing angle, high contrast, and paper whitening effect are attained and the pixel electrode forming steps are made simple.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:

a reflector;

a light scattering layer formed on the reflector, and formed of light scattering particles introduced into a transparent resin;

a first transparent electrode formed on the light scattering layer;

a transparent substrate opposed to the light scattering layer with a prescribed gap interposed therebetween;

a second transparent electrode formed on the transparent substrate and having a portion that is opposed to the first transparent electrode; and a liquid crystal layer introduced into the gap between the light scattering layer and the transparent substrate and having a portion that is inserted between the first and the second transparent electrode, wherein a ratio of total scattering energy to incident energy per unit cross-sectional area of a single particle is in a range between 0.8 to 3.0.

2. The liquid crystal display device according to claim 1, wherein a volume concentration PVC of the light scattering particles in the light scattering layer, an average size D of the light scattering particles, and an effective thickness d of the light scattering layer are related by the following expression $$PVC \geqq D/(3d).$$

3. The liquid crystal display device according to claim 2, wherein the effective thickness d of the light scattering layer is 10 micrometers or less.

4. The liquid crystal display device according to claim 1, wherein the reflector is made of an electrically conducting material, the light scattering layer has at least one opening to expose the reflector, and the first transparent electrode is electrically connected to the reflector through the at least one opening.

5. The liquid crystal display device according to claim 1, wherein the transparent resin comprises an acrylic resin.

6. The liquid crystal display device according to claim 1, wherein the particles are made of one selected from a group of titanium oxide, zinc oxide, antimony oxide, zirconium oxide, calcium carbonate, calcium sulfate, barium sulfate and alminum oxide.

7. The liquid crystal display device according to claim 1, wherein the liquid crystal layer includes guest-host type liquid crystal.

8. A liquid crystal display device comprising:

a reflector;

a light scattering layer formed on the reflector, and formed of light scattering particles introduced into a transparent resin;

a first transparent electrode formed on the light scattering layer;

a transparent substrate opposed to the light scattering layer with a prescribed gap interposed therebetween;

a second transparent electrode formed on the transparent substrate and having a portion that is opposed to the first transparent electrode; and a layer of a guest-host type liquid crystal introduced into the gap between the light scattering layer and the transparent substrate and having a portion that is inserted between the first and the second transparent electrode, wherein a ratio of total scattering energy to incident energy per unit cross-sectional area of a single particle is in a range between 0.8 to 3.0.

9. The liquid crystal display device according to claim 8, wherein a volume concentration PVC of the particles in the light scattering layer, an average size D of the particles and an effective thickness d of the light scattering layer are related by $$PVC \geqq D/(3d).$$

10. The liquid crystal display device according to claim 9, wherein the effective thickness d of the light scattering layer is 10 micrometers or less.

11. The liquid crystal display device according to claim 8, wherein the reflector is made of an electrically conducting material, the light scattering layer has at least one opening to expose the reflector, and the first transparent electrode is electrically connected to the reflector through the at least one opening.

12. The liquid crystal display device according to claim 8, wherein the transparent resin comprises an acrylic resin.

13. The liquid crystal display device according to claim 8, wherein the particles are made of one selected from a group of titanium oxide, zinc oxide, antimony oxide, and zirconium oxide.

14. A liquid crystal display device, comprising:

a reflector;

a light scattering layer formed on the reflector, and formed of light scattering particles introduced into a transparent resin;

a first transparent electrode formed on the light scattering layer;

a transparent substrate opposed to the light scattering layer with a prescribed gap interposed therebetween;

a second transparent electrode formed on the transparent substrate and having a portion that is opposed to the first transparent electrode; and a liquid crystal layer introduced into the gap between the light scattering layer and the transparent substrate and having a portion that is inserted between the first and the second transparent electrode, wherein the reflector is made of an electrically conducting material, the light scattering layer has at least one opening to expose the reflector, and the first transparent electrode is electrically connected to the reflector through the at least one opening.

15. The liquid crystal display device according to claim 14, wherein an effective thickness of the light scattering layer is 10 micrometers or less.

16. The liquid crystal display device according to claim 14, wherein the liquid crystal layer includes guest-host type liquid crystal.

* * * * *